(12) United States Patent
Yu et al.

(10) Patent No.: US 9,860,285 B2
(45) Date of Patent: Jan. 2, 2018

(54) SYSTEM, APPARATUS, AND METHOD FOR SHARING A SCREEN HAVING MULTIPLE VISUAL COMPONENTS

(71) Applicant: Futurewei Technologies, Inc., Plano, TX (US)

(72) Inventors: Haoping Yu, Carmel, IN (US); Xin Wang, Rancho Palos Verde, CA (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 303 days.

(21) Appl. No.: 14/158,096

(22) Filed: Jan. 17, 2014

(65) Prior Publication Data

US 2014/0229542 A1 Aug. 14, 2014

Related U.S. Application Data

(60) Provisional application No. 61/753,823, filed on Jan. 17, 2013.

(51) Int. Cl.
*H04L 29/06* (2006.01)
*H04N 19/27* (2014.01)

(52) U.S. Cl.
CPC .......... *H04L 65/403* (2013.01); *H04L 65/607* (2013.01); *H04L 69/04* (2013.01); *H04N 19/27* (2014.11)

(58) Field of Classification Search
CPC ..... H04N 19/27; H04L 65/403; H04L 65/607; H04L 69/04
See application file for complete search history.

(56) References Cited

U.S. PATENT DOCUMENTS 5,764,167 A 6/1998 Adams et al.
6,005,582 A * 12/1999 Gabriel .................. G06T 11/40
345/586

(Continued)

FOREIGN PATENT DOCUMENTS

CN 102771119 A 11/2012
JP 2012005107 5/2012

(Continued)

OTHER PUBLICATIONS

Xin Wang et al: "Screen Content Sharing for MMT: Use Cases"; ISO/IEC JTC1/SC29/WG11 MPEG2013/m31302; Oct. 2013, Geneva, CH; 2 pages.

*Primary Examiner* — Ranodhi Serrao (57) ABSTRACT

Embodiments of the invention provide a screen sharing technology including a local computing device and a remote computing device. The local computing device compresses pixel data captured from a frame buffer of the local computing device into a video stream. When the local computing device determines that a video visual component is to be displayed, it obtains compressed data for the video visual component, location information and temporal information. The remote computing device decodes the compressed data and the video stream in different decoder and displays the video stream and compressed data on its monitor according to the temporal information and location information. As such, the embodiment described above leads to better coding efficiency, better coding quality, and lower bit rate.

12 Claims, 7 Drawing Sheets

(56) References Cited

U.S. PATENT DOCUMENTS

| | | | | |
|---|---|---|---|---|
| 6,314,438 | B1 * | 11/2001 | Stein | G06F 9/4446 715/203 |
| 8,520,734 | B1 * | 8/2013 | Xu | H04N 19/105 375/240.02 |
| 9,026,615 | B1 * | 5/2015 | Sirton | H04L 65/60 709/217 |
| 2006/0031779 | A1 | 2/2006 | Theurer et al. | |
| 2006/0069797 | A1 | 3/2006 | Abdo et al. | |
| 2009/0235170 | A1 | 9/2009 | Golden et al. | |
| 2011/0078532 | A1 | 3/2011 | Vonog et al. | |
| 2011/0150433 | A1 | 6/2011 | Alexandrov et al. | |
| 2011/0173256 | A1 | 7/2011 | Khalatian | |
| 2011/0202854 | A1 | 8/2011 | Chan et al. | |
| 2012/0133727 | A1 * | 5/2012 | Bolduc | H04N 7/152 348/14.07 |
| 2012/0317485 | A1 * | 12/2012 | Ding | G06F 3/1454 715/719 |
| 2013/0132485 | A1 | 5/2013 | Thomas et al. | |

FOREIGN PATENT DOCUMENTS

| | | |
|---|---|---|
| KR | 101017866 B1 | 3/2011 |
| KR | 20140106551 A | 9/2014 |

\* cited by examiner

SYSTEM, APPARATUS, AND METHOD FOR SHARING A SCREEN HAVING MULTIPLE VISUAL COMPONENTS

This application claims priority to U.S. provisional application No. 61/753,823, filed Jan. 17, 2013, and entitled, "New system architecture and solutions for compressing and encoding screen content."

FIELD OF THE INVENTION

The invention generally relates to screen sharing technologies, and more specifically, to transmitting screen content from one networking device to another networking device for screen sharing.

BACKGROUND

Screen sharing among computing devices such as computers, is an important tool for people at different locations to share information and achieve various tasks. For example, if a problem arises on a remote computing device, a technician at a viewing device may be able to address the problem by signing onto a computer and viewing the Graphical User Interface (GUI) of the remote computing device with the problem. This eliminates the need for the technician to travel to the problem site. Screen sharing also allows workers to access their work computers from any Internet-enabled device, including home computers, laptops and even PDAs. Another advantage of screen sharing is presentation sharing, which turns dry teleconferences into engaging online presentations.

In order to share screen content, the screen content displayed on a monitor need to be collected and transmitted to a remote computing device. Conventionally, the local computing device samples pixel data of a screen image at a certain rate, for example, 20 frame per second. The sampled pixel data of the screen image then is compressed, packaged and transmitted to the remote computing device. The remote computing decompresses the received data, and displays it on its monitor. Alternatively, in order to reduce network resource consumption, instead of transmitting a whole screen image, the local computing device may compare a screen image to be displayed with a previous screen display, and only sends updates to the previous screen image to the remote computing device.

The conventional way of screen sharing works acceptably when the screen content includes only static images. It produces unsatisfactory results, however, when the screen content includes video images. When the remote computing device reproduces the shared screen based on the captured screen pixel data sent by the sharing device, the quality of the video images in the reproduced screen can be significantly degraded.

DETAILED DESCRIPTION

Figure 1:
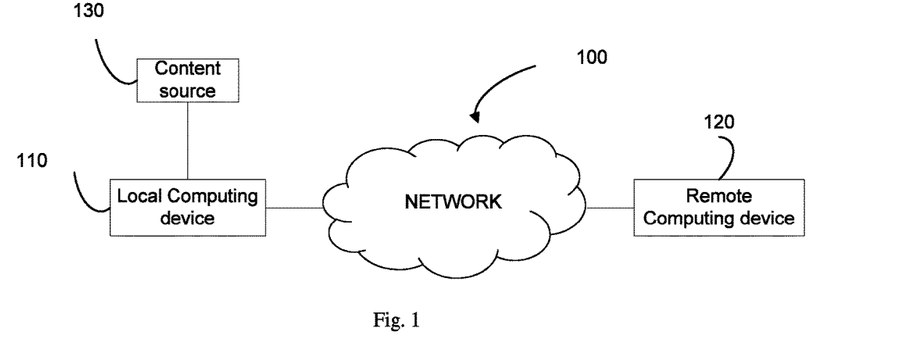
FIG. 1 is a block diagram of a screen sharing system showing the overall configuration of the screen sharing system according to an embodiment of the invention.

FIG. 1 shows the overall configuration of a screen sharing system 100 according to an embodiment of the invention. The screen sharing system includes a local computing device 110 and a remote computing device 120 connected for communicating with each other via a network connection. A third party content source 130 provides compressed data for display by the local computing device 110. The compressed data may be a Moving Picture Experts Group (MPEG) file, a Joint Photographic Experts Group (JPEG) file, or any other compressed files. The local computing device 110 transmits compressed screen content data for screen sharing to the remote computing device 120 which has capabilities to receive the compressed screen content data, decompress the compressed screen content data, and display the screen content on its monitor, thereby accomplishing the screen sharing operation.

Examples of the network include, but are not limited to, local-area networks (LAN), metro-area networks (MAN), and wide-area networks (WAN), such as the Internet or World Wide Web. The local computing device 110 and the remote computing device 120 may connect to the network through one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g)).

Figure 2:
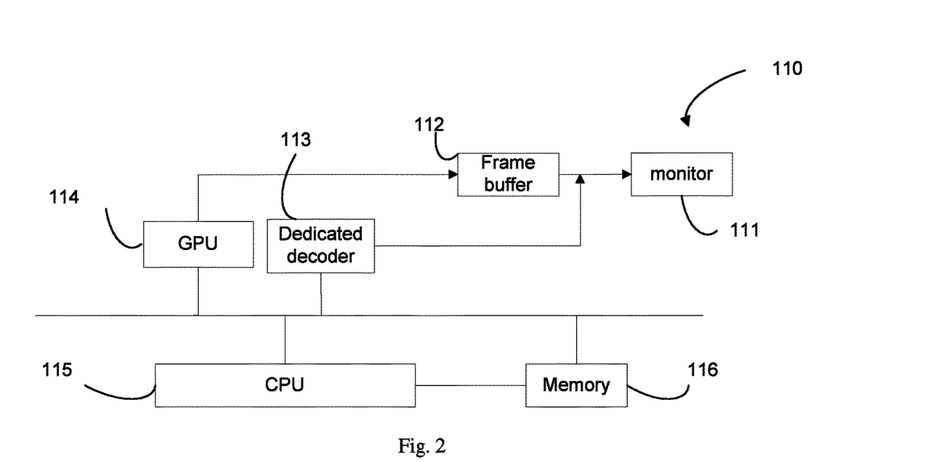
FIG. 2 is a diagram showing structure of a computing device, in accordance with an embodiment of the invention.

The local computing device 110 is shown in FIG. 2, which may include a Central Processing Unit (CPU) 115, a Graphics Processing Unit (GPU) 114, a dedicated decoder 113, a memory 116, a frame buffer 112 and a monitor 111. The local computing device 110, as appreciated by people skilled in the art, may include other components, such as a mouse, or a keyboard, etc. The remote computing device 120 may have similar, or different, configurations.

The memory 116 may include non-volatile computer storage media, such as read-only memory (ROM) and volatile computer storage media, such as random-access memory (RAM). Typically stored in the ROM is a basic input/output system (BIOS), which contains program code for controlling basic operations of the computing systems including start-up of the computing device and initialization of hardware. Stored within the RAM are program code and data. Program code includes, but is not limited to, application programs, program modules (e.g., browser plug-ins), and an operating system (e.g., Windows Operation System). The memory 116 may include a plurality of components physically separated to each other. For example, a part of the RAM is located in a graphics card, while another part of the RAM is connected to other components of the local computing device 110 via Peripheral Component Interconnect Express (PCIe) interface. Collectively, they are called "memory".

The frame buffer 112 may be a portion of the RAM of the memory, which stores uncompressed pixel-level data generated by the CPU 115, the GPU 114, or dedicated decoder 113 so as to represent graphics content displayable on the monitor 111 of the local computing device 110. Typically, the frame buffer 112 is located on the graphics card.

The CPU 115 may be a microprocessor suitable for retrieval and execution of instructions and/or electronic circuits can be configured to perform the functionality software programs. The GPU 114 is a specialized processor that has been developed to optimize the computations required in executing the graphics rendering procedures. The GPU 114 processes data to generate pixel data of images displayable on the monitor 111. Typically, the GPU 114 is mounted on a printed circuit board of the graphics card. The dedicated decoder 113, such as a MPEG decoder, a JPEG decoder, is configured to decompress certain compressed data, for example, a MPEG video, or a JPEG image. The dedicated decoder 113 may be incorporated in the GPU 115, or may be a separated module mounted on the graphics card together with the GPU 115. The dedicated decoder 113 is not necessary in a form of hardware as described above, it could be implemented as software as appreciated by people skilled in the art. For illustration purpose, the term "processor" referred to in this patent application could be the GPU 114, the dedicated decoder 113, the CPU 114, or any combination of the GPU 114, the dedicated decoder 113, and the CPU 114.

Figure 3:
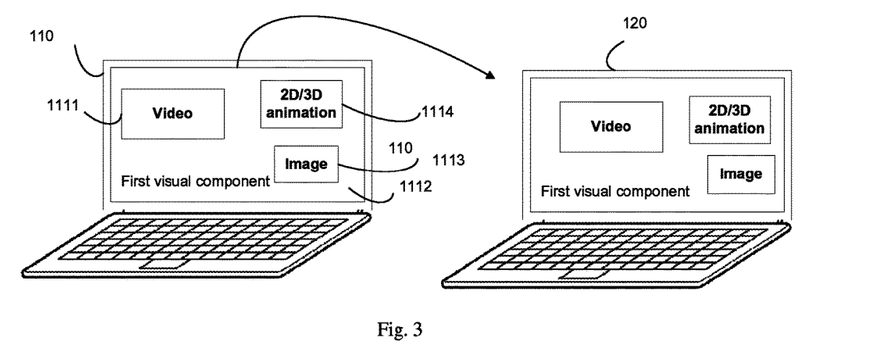
FIG. 3 illustrates visual components displayed on a computing device according to an embodiment.

Referring to FIGS. 2 and 3, the local computing device 110 may be used to do different things using different software program, for example, editing text on Word, or Spreadsheet, browsing web page with a web browser, playing video game, displaying photos, and watching movies, etc. Accordingly, different visual components may be displayed on the monitor 111 of the local computing device 110, i.e., text, graphics, 2D/3D animations, image, and video, etc. The visual components of the screen content displayed on the monitor 111 may be categorized into different types. The first visual component 1112 of the screen content, i.e. Category 1, includes everything generated by the graphic processor in the GPU 114, e.g. texts and graphics and 2D/3D animations 1114, even decoded visual content, etc. Usually, these data in the first category are saved as RGB pixels in the frame memory or buffer (FB) inside the GPU 114. The second visual component, i.e. Category 2, has contents that have been previously compressed such as video 1111 and images 1113 displayed the monitor 111. Typically, the video visual component 1111 and the image visual component 1113 are decoded by the GPU 114, or the dedicated decoder 113. The compressed data, for example, the image file, may be compressed as JPEG (Joint Photographic Experts Group) file, Exif (Exchaneable image file format) file, TIFF (Tagged Image File Format) file, GIF (Graphics Interchange Format) file, PNG (Portable Network Graphics) file, etc., and the video file, may be compressed as MPEG-2, MPEG-4, AVI, MP4, etc. The pixel data for the video visual component 1111 or the image visual component 1113 may be saved in the frame buffer 112 together with the first visual component 1112 to form an entire image to be displayed on the monitor 111, or added together to the pixel data for the first visual component from the frame buffer 112 through an overlay process on the fly to generate the final output video signal to the monitor 111. Certain content of the first visual component 1112 may have different characteristics, for example, the 2D/3D animation 1114, such content can be taken out from the first visual component, compressed and transmitted to the remote computing device 120 separately from the first visual component. For illustration purpose, such content is named as "third visual component", which is also generated by the processor and saved in the frame buffer 112, but it may have different characteristics such as the 2D/3D animation 1114.

In most of today's desktop/screen sharing applications, the local computing device 110 shares the visual components to the remote computing device 120 by compressing pixel data saved in the frame buffer 112, and sending the compressed pixel data to the remote computing device 120. Depending on GPU design, the video component or image component described above may not be saved in the frame buffer 112, as a result, black/white areas may be seen on the remote computing device. However, these black/white areas would not appear in the monitor on the local computing device since they will be filled up by the actual decompressed data, such as video and/or images. Therefore, this kind of screen/desktop sharing solution may not be satisfactory and most of time may not be acceptable in commercial products. However, there may be applications that are able to obtain the first visual component and the second visual component for screen sharing purposes. Basically, this kind of solutions would firstly decompress those previously compressed video file and/or image file and then add them together with the pixel data for the first visual component 1112 (texts/graphics/animations) before compressing them into a video stream for the remote computing device 120. With this second approach, the previously compressed video file and image file will be decompressed and re-compressed as part of the screen content. Therefore, it makes the screen content compression rather complicated and usually results in poor compression performance. This may be mainly due to the fact that screen sharing application often requires real-time processing and compressing. Since these video and image have been compressed before coming to the local computing device 110, re-compressing them again for screen sharing may not be a good and elegant engineering solution.

Figure 4:
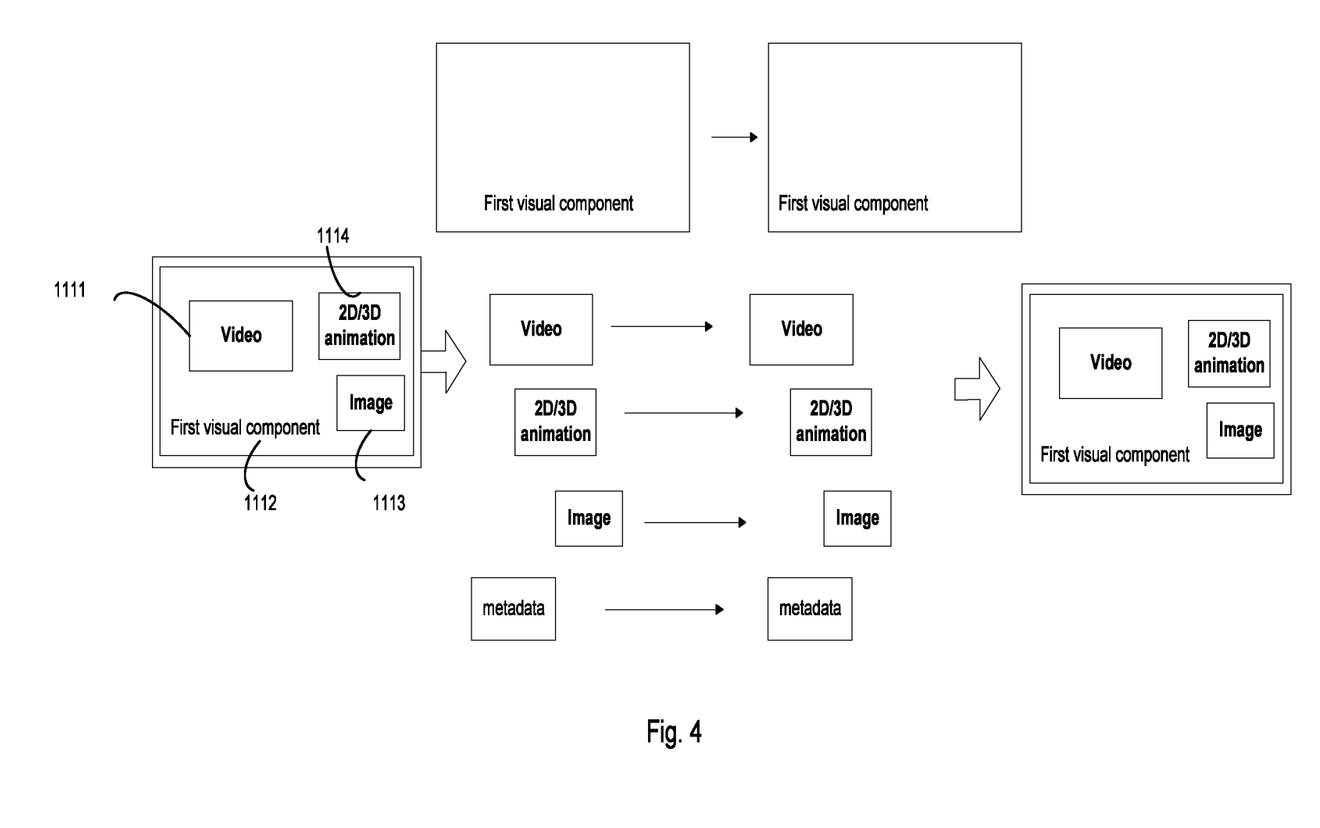
FIG. 4 illustrates different visual components being processed differently and separately to be shared with another computing device according to an embodiment.

As shown in FIG. 4, the visual components shown on the local computing device 110 includes the first visual component 1112, the video visual component 1111, the image component 1113 and the third visual component 1114 which is taken out from the first visual component 1112. Each visual component may be processed differently and separately rather than compressing all the visual components into a video stream and sharing the video stream with the remote computing device. For example, the first visual component 1112 which is generated by the processor and saved in the frame buffer 112 may be compressed into a video stream separately from data for other visual components. The second visual component which is previously compressed such as compressed video files for the video visual component 1111 or the compressed image file for the image visual component 1113 may be shared with the remote computing device 120 by sending the compressed data, such as the compressed video file or the compressed image file to the remote computing device 120 without going through the decompressing/re-compressing procedure. As another example, the third visual component taken out from the first visual component may be compressed separately from the background component. The main reasons for processing different visual contents differently are that (1). their characteristics may be quite different, so having a single video codec may result in poor compression performance, (2). some of them may have been already compressed when they come to the computer, e.g. video and images compressed in MPEG1/MPEG2/VC8/JPEG/JPEG2k, etc, so re-encoding them is kind of a waste of computation resources and re-encoding often implies reduced visual quality. As such, the embodiment described above leads to better coding efficiency, better coding quality, and lower bit rate.

Figure 5:
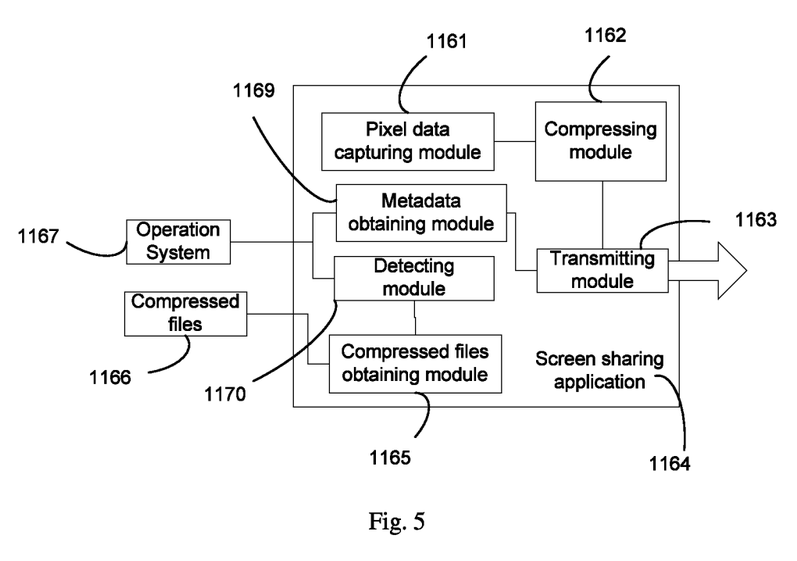
FIG. 5 is a block diagram of a screen sharing application together with an operation system and compressed files stored in a memory of the computing device according to an embodiment of the invention.

Referring to FIG. 5, the operating system 1167, the compressed files 1166, such as the video file, and/or the image files, and a screen sharing application 1164 is stored in the memory 111 (the memory is not shown in FIG. 5) of the local computing device 110. The screen sharing application 1164 includes a pixel data capturing module 1161, a metadata obtaining module 1169, a detecting module 1170, a compressing module 1162, a compressed data obtaining module 1165, and a transmitting module 1163.

Figure 6A:
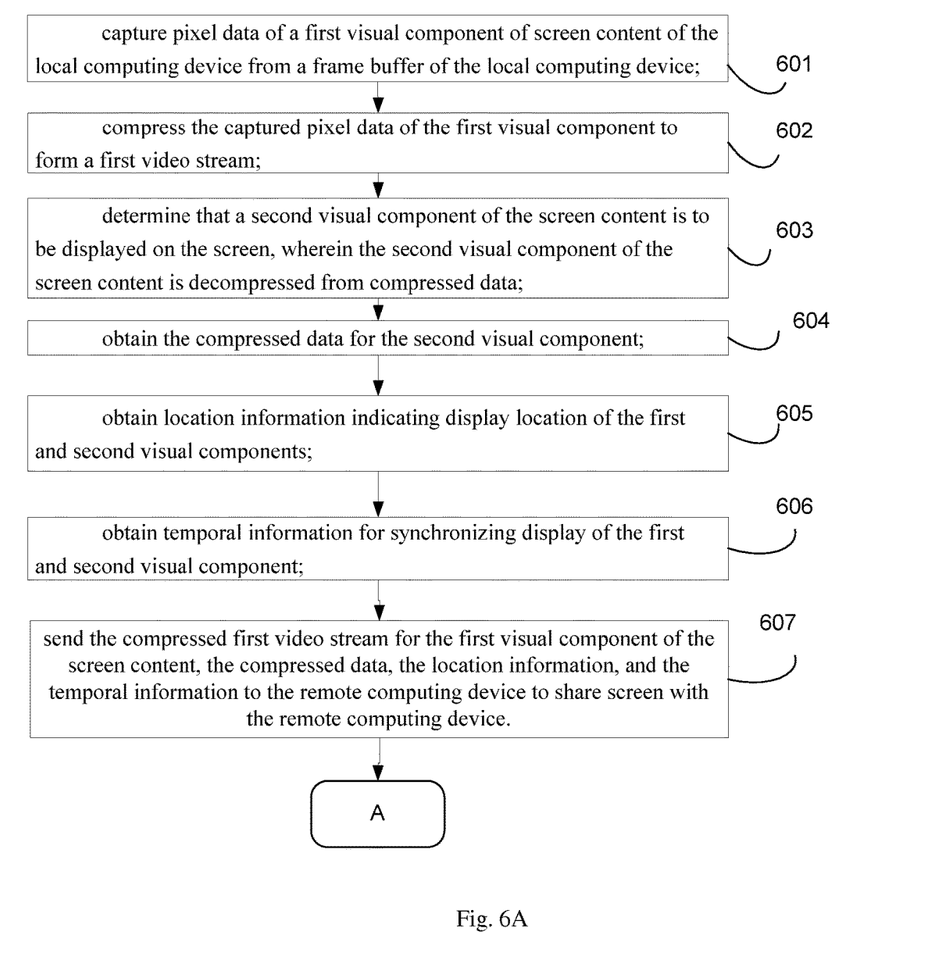
FIGS. 6A and 6B is a flow chart depicting exemplary steps for implement screen sharing according to an embodiment.
Figure 6B:
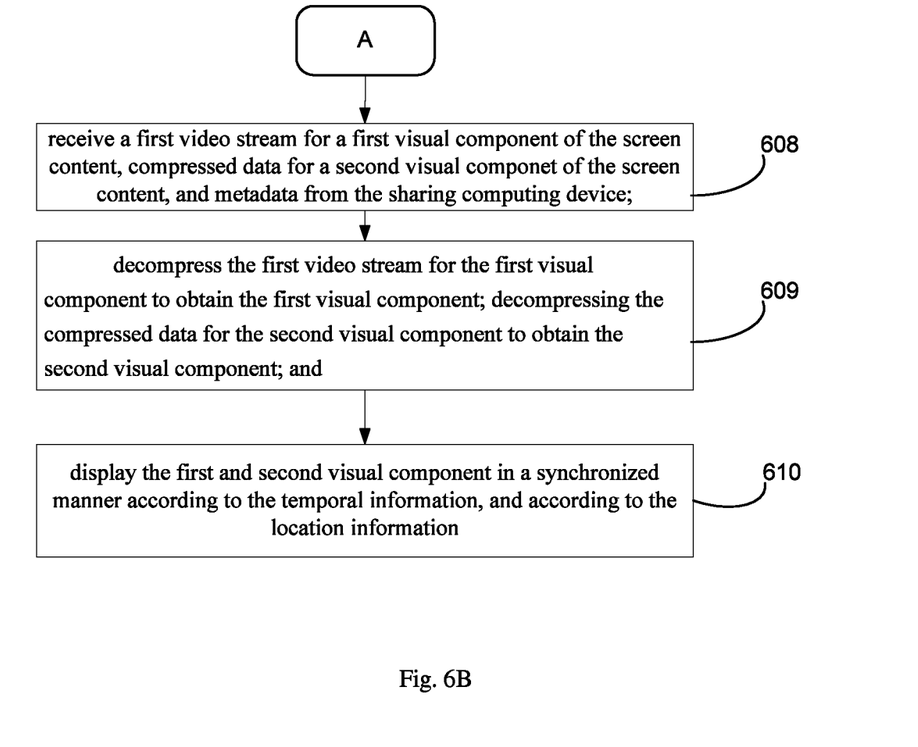

Referring to FIG. 5, together with FIGS. 6A, 6B. They depict an embodiment of implementing screen sharing.

The pixel data capturing module 1161 captures pixel data of the first visual component from the frame buffer 112 (step 601). The pixel data capturing module 1161 may sample the pixel data of the visual component at a suitable rate and resolution (e.g., an MPEG compliant frame rate and resolution).

Figure 7:
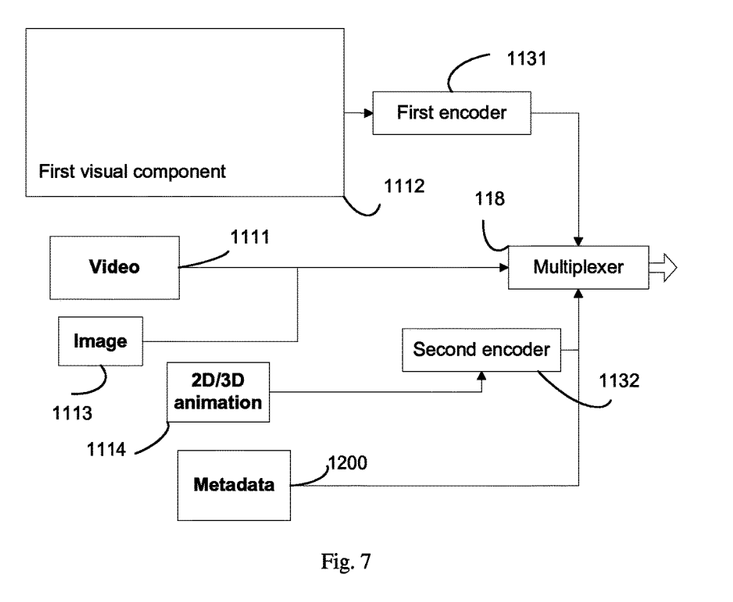
FIG. 7 illustrates different visual components being processed differently, separately, and being multiplexed into a data stream to be sent according to an embodiment.

Instead of sending the captured pixel data directly, the compressing module 1162 compresses the captured pixel data to create a video stream that can accommodate the bandwidth limitations imposed by the network and the maximum allowable data rate of the remote computing device (step 602). The compressing format may be MPEG (Motion Picture Experts Group), or any type of compression and/or media stream format supported by the remote computing device. Specifically, as shown in FIG. 7, the compressing module 1162 may includes a first encoder 1131 for compressing the first visual component 1112, and a second encoder 1132 for compressing the third visual component which is taken out from the first visual component 1112. The pixel data of the first visual component compressed by the first encoder forms a video stream, while the pixel data of the third visual component compressed by the second encoder forms another video stream separately from the video stream for the first visual component. When the compressing module 1162 compresses the first visual component, the area occupied by the other visual components on screen which will be processed differently may be filled with pixels representing any texture (such as lines), flat field, or text in any color as long as they will help reduce the overall bit rate for the entire first visual component. Similarly, if the third visual component is compressed and transmitted separately from the first visual component, the area occupied by the third visual component on screen can also be filled with pixels representing any texture (such as lines), flat field, or text in any color as long as they will help reduce the overall bit rate for the entire first visual component.

The detecting module 1170 determines that the screen of the local computing device 110 is going to display the second visual component, such as the video visual component or the image visual component (step 603). Both the video visual component and the image visual component are decompressed from compressed data. There are many ways to make the determination. For example, when a command is given by a user to open a compressed file is detected. As another example, the detecting module make decision based on that compressed data is being decompressed by the GPU 114 or dedicated decoder 113, or compressed data is decompressed and saved in the frame buffer 112.

The compressed data obtaining module 1165 obtains the compressed data from the memory of the local computing device (step 604). Once the determination in step 603 is made, the local computing device 110 would obtain the compressed data and prepare to send it to the remote computing device 120.

In order to display different visual components on the remote computing device 120 in the same way they are displayed on the local computing device 110, the metadata obtaining module 1169 may obtain metadata 1120 which includes temporal information and/or location information (steps 605 and 606). The temporal information may include information about time-stamps, start, end, duration, etc and is used for synchronizing different visual components, and location information, such as x-y coordinates, indicates display location(s) of the visual component. To be more specific, the location information may indicates display location of the first visual component, the second visual component (the video visual component and/or the image visual component), and the third visual component. The location information may further include transparency information of each visual component, and other information about the arrangement of these visual components in making the final composition displayed on the monitor of the remote computing device 120. As an example, the metadata may further include permission information for one or more of the visual components. The permission information may be carried by each visual component; therefore, the owner of the local computing device 110 can control which visual component to be shared with the remote computing device 120. This feature may be rather useful for hiding some visual component for privacy reason in screen sharing applications. The metadata including location information, temporal information, and other factor used in making the final composition usually can be provided either by the individual software application that may be currently displayed as part or for the entire screen content. It can also be provided by the operating system itself.

The transmitting module 1163 sends the video stream for the first visual component, the video stream of the video file for the video visual component, the video stream of the image file for the image visual component, the video stream for the third visual component, and the metadata 1200 to the remote computing device 120 (step 607). As shown in FIG. 7, the local computing device 110 may multiplex the video stream for the first visual component, the video stream of the video file for the video visual component, the video stream of the image file for the image visual component, the video stream for the third visual component, and the metadata 1200 as a data stream (also can be called a video stream) and send them to the remote computing device 120. The metadata 1200 can be shared with the remote computing device 120, together with the encoded/compressed data of the visual components, in either multiplexed streams or through separate channels, in order to achieve optimal delivery for each of the components. As an example, the video stream for the background component can be shared just once, whereas the other components, the video stream of the video file or the video stream for video component and maybe the video stream for the separated component may be delivered periodically or even continuously in a streaming fashion.

Figure 8:
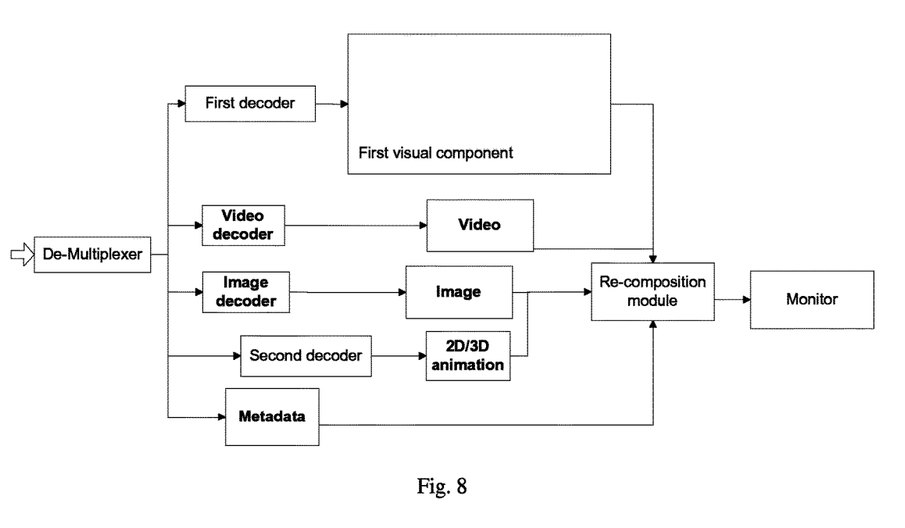
FIG. 8 illustrates different visual components received being decoded differently and separately according to an embodiment.

Referring to FIG. 6B and FIG. 8, the remote computing device 120 receives the data stream including the video streams for the first visual component, the video file for the video visual component, the image file for the image visual component, and the metadata 1200 (step 608). In the case the third visual component is taken out from the first visual component, the remote computing device 120 may receive the video stream for the third visual component as well. The remote computing device 120 firstly de-multiplexes the received data stream into different data streams: the video stream for the first visual component, the video stream for the video visual component, the video stream for the image visual component, and the metadata 1200, and maybe the video stream for the third visual component depending on whether or not the third visual component taken out from the first visual component and compressed differently and separately from the first visual component.

Each video stream may further be decoded by its own decoder (step 609). As shown in FIG. 8, the video stream for the video visual component may be decompressed by a video decoder such as a MPEG decoder. The video stream of the image file may be decoded by an image decoder such as a JEPG decoder. The compressed pixel data for first visual component may be decompressed by a first decoder while the video stream for the 2D/3D animation taken from the first visual component may be decoded by a 2D/3D animation decoder. The decoder mentioned herewith may be hardware mounted on a graphics card of the remote computing device 120, or implemented by software.

Then the remote computing device 120 displays the background component, the video component, and the image component according to the metadata received (step 610). The remote computing device 120 displays the video stream for the background component, the video stream for the video component, the video stream for the image component in a synchronized manner according to the temporal information. The remote computing device 120 also displays the video stream for the background component, the video stream for the video component, and the video stream for the image component according to the location information so the visual components are arrange in the same way as displayed on the monitor of the local computing device. If the third visual component is taken out from the first visual component, the third visual component will be displayed according to the temporal information and the location information pertaining to it. Specifically, the final screen video displayed on the monitor of the remote computing device 120 will be generated by a screen content composition module where the information about the location information, the temporal information, and the permission information will be used in the composing the final screen content for display.

Although the present invention has been described with reference to specific features and embodiments thereof, it should be understood that various changes and substitutions can be made thereto without departing from the spirit and scope of the present invention as defined by the following claims.

What is claimed is:

1. A method, performed by a local computing device for sharing screen images with a remote computing device, the method comprising:
    capturing pixel data of a first visual component of screen content of the local computing device from a frame buffer of the local computing device;
    compressing the captured pixel data of the first visual component to form a first video stream;
    determining that a second visual component of the screen content is to be displayed on the screen, wherein the second visual component of the screen content is decompressed from compressed data;
    obtaining the compressed data for the second visual component;
    obtaining location information indicating display location of the first and second visual components, temporal information for synchronizing display of the first and second visual components, and permission information for the first visual component, the second visual component, or both, wherein the permission information indicates whether the first visual component, the second visual component, or both are to be presented on the remote computing device; and
    sending the compressed first video stream for the first visual component of the screen content, the compressed data for the second visual component, the location information, the temporal information, and the permission information to the remote computing device to share screen with the remote computing device.

2. The method according to claim 1, wherein the step of determining includes detecting that:
    a command is given by a user to open compressed data;
    the compressed data is being decompressed by a processor of the local computing device; or
    the compressed data is decompressed and saved in the frame buffer.

3. The method according to claim 1, wherein the compressed data is a video file while the second visual component is a video visual component.

4. The method according to claim 1, wherein the compressed data is an image file while the second visual component is an image visual component.

5. The method according to claim 1, wherein the compressed data is sent as a video stream.

6. The method according to claim 1, further comprising
    capturing pixel data of a third visual component taken out from the first visual component from the frame buffer of the local computing device;
    compressing the captured pixel data of the third visual component into a second video stream; and
    sending the compressed second video stream to the remote computing device.

7. A computing device for sharing screen images with a remote computing device, the computing device comprising:
    a monitor;
    a frame buffer; and
    a processor coupled with the frame buffer and the monitor, the processor configured to:
    capture pixel data of a first visual component of screen content to be displayed on the monitor of the computing device from the frame buffer;
    compress the captured pixel data of the first visual component to form a first video stream;
    determine that a second visual component of the screen content is to be displayed on the monitor, wherein the second visual component of the screen content is decompressed from compressed data;
    obtain the compressed data for the second visual component;
    obtain location information indicating display location of the first and second visual components, temporal information for synchronizing display of the first and second visual component, and permission information for the first visual component, the second visual component, or both, wherein the permission information indicates whether the first visual component, the second visual component, or both are to be presented on the remote computing device; and
    send the compressed first video stream for the first visual component of the screen content, the compressed data for the second visual component, the location information, the temporal information, and the permission information to the remote computing device to share screen with the remote computing device.

8. The computing device according to claim 7, wherein the processor determine that a second visual component of the screen content is to be displayed on the monitor when the processor detects:
- a command is given by a user to open compressed data;
- the compressed data is being decompressed by a processor of the local computing device; or
- the compressed data is decompressed and saved in the frame buffer.

9. The computing device according to claim 7, wherein the compressed data is a video file while the second visual component is a video visual component.

10. The computing device according to claim 7, wherein the compressed data is an image file while the second visual component is an image visual component.

11. The computing device according to claim 7, wherein the compressed data is sent as a video stream.

12. The computing device according to claim 7, the processor further configured to:
- capture pixel data of a third visual component taken out from the first visual component from the frame buffer;
- compress the captured pixel data of the third visual component into a second video stream; and
- send the compressed second video stream to the remote computing device.

* * * * *